United States Patent
Kawanishi

(10) Patent No.: US 7,693,410 B2
(45) Date of Patent: Apr. 6, 2010

(54) OPTICAL APPARATUS AND FOCUS ADJUSTMENT METHOD

(75) Inventor: Atsuya Kawanishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 700 days.

(21) Appl. No.: 11/551,925

(22) Filed: Oct. 23, 2006

(65) Prior Publication Data

US 2007/0092242 A1   Apr. 26, 2007

(30) Foreign Application Priority Data

Oct. 26, 2005   (JP) ............................... 2005-311442

(51) Int. Cl.
  *G03B 3/10*   (2006.01)
  *G03B 17/00*  (2006.01)
  *G03B 13/00*  (2006.01)
(52) U.S. Cl. ..................... 396/101; 396/79; 348/349; 348/355
(58) Field of Classification Search .................. 396/101
  See application file for complete search history.

(56) References Cited

U.S. PATENT DOCUMENTS

| | | | | |
|---|---|---|---|---|
| 4,975,726 A | * | 12/1990 | Kuga et al. ................. | 396/101 |
| 4,990,947 A | * | 2/1991 | Komiya et al. ............. | 396/101 |
| 4,992,859 A | * | 2/1991 | Yoshida ...................... | 348/347 |
| 6,636,266 B2 | | 10/2003 | Takahashi ................... | 348/445 |
| 7,184,090 B2 | * | 2/2007 | Watanabe et al. ........... | 348/349 |
| 2002/0154909 A1 | * | 10/2002 | Yamazaki et al. .......... | 396/125 |
| 2004/0257461 A1 | * | 12/2004 | Toyomura ................... | 348/345 |
| 2005/0275744 A1 | * | 12/2005 | Yasuda ....................... | 348/345 |
| 2006/0132617 A1 | * | 6/2006 | Ohta ....................... | 348/220.1 |

FOREIGN PATENT DOCUMENTS

JP          07-107359          4/1995

* cited by examiner

*Primary Examiner*—W. B. Perkey
*Assistant Examiner*—Dennis Hancock
(74) *Attorney, Agent, or Firm*—Fitzpatrick, Cella, Harper & Scinto

(57) ABSTRACT

An optical apparatus is disclosed which can perform accurate focus control even when an image of an object at low contrast is picked up in high resolution. The optical apparatus includes a plurality of band-pass filters for different frequency bands and extracts a focus signal from the image signal through each of the band-pass filters, and a controller which performs focus control based on the extracted focus signal. In the focus control by the controller, the band-pass filters are selectively used to extract the focus signal depending on a resolution for recording the image signal.

13 Claims, 14 Drawing Sheets

OPTICAL APPARATUS AND FOCUS ADJUSTMENT METHOD

BACKGROUND OF THE INVENTION

The present invention relates to an optical apparatus such as a video camera and a digital still camera, and more particularly, to an optical apparatus which performs focus control with a focus signal extracted from an image signal.

In a predominant auto-focus method for an optical apparatus such as a video camera, an object image is photoelectrically converted into an image signal by an image-pickup element, a focus signal representing the sharpness (contrast) of the image is extracted from the image signal, and the position of a focus lens is controlled so as to achieve the maximum level of the focus signal. This is referred to as a TV-AF (television auto-focus) method or a contrast detection method.

The focus signal also referred to as an AF evaluation value signal is provided by extracting a high-frequency component from the image signal through a band-pass filter. When an ordinary object image is picked up, the level of the signal is increased as the focus lens approaches an in-focus state, and the position where the level is at the maximum corresponds to the in-focus point. It is known that the level of the focus signal is abruptly changed when the central frequency of the band-pass filter is high in the band of the image signal and is gradually changed when the central frequency is low, as shown in FIG. 2.

The frequency characteristic of the band-pass filter for extracting the focus signal is set such that the level of the focus signal is adequately reduced by moving the focus lens within the depth of focus around the in-focus point. This enables clear determination of the peak of the focus signal, that is, the in-focus point. Even when the focus lens is located away from the in-focus point, the focus lens can be moved by an amount approximately equal to the depth of focus to provide obviously different levels of the focus signal, thereby allowing determination of an in-focus direction.

Recently, in addition to the conventional SD (standard-definition) image (720 H×480 V), the enhanced HD (high-definition) image (1440 H×1080 V) has been used, and video cameras therefor have been proposed. Specifically, in a proposed technique, an HD image signal is produced by an output from a first image-pickup area (1440 H×1080 V) of an image-pickup element and an SD image signal is produced by reducing an output from a second image-pickup area (1080 H×1080 V)

In video cameras, favorable auto-focus (AF) control needs to be performed regardless of whether the HD or SD image is used. Japanese Patent Laid-Open No. H07(1995)-107359 has disclosed a method in which an optical apparatus capable of converting an image signal formed by an image-pickup element into another image signal can produce an AF evaluation value signal from the image signal before the conversion to perform satisfactory AF control regardless of the HD or SD image.

With the method disclosed in Japanese Patent Laid-Open No. H07(1995)-107359, however, AF accuracy may be low in picking up an HD image. For example, when an image of an object at low contrast is picked up, it may be determined that an HD image is not in focus even when the AF accuracy is at a proper level for an SD image.

This is because the method disclosed in Japanese Patent Laid-Open No. H07(1995)-107359 cannot find a change in the focus signal level needed to perform AF control for the HD image when the object is at low contrast. In other words, even when the focus lens is driven within the depth of focus around the in-focus point, that in-focus point cannot be determined clearly.

BRIEF SUMMARY OF THE INVENTION

It is an object of the present invention to provide an optical apparatus which can perform accurate focus control even when an image of an object at low contrast is picked up in high resolution such as an HD format.

According to an aspect, the present invention provides an optical apparatus which records a picked-up image signal. The apparatus comprises an extractor which includes a plurality of band-pass filters for different frequency bands and extracts a focus signal from the image signal through each of the band-pass filters, and a controller which performs focus control based on the extracted focus signal. In the focus control by the controller, the band-pass filters are selectively used to extract the focus signal depending on a resolution for recording the image signal.

According to another aspect, the present invention provides an optical apparatus which records a picked-up image signal. The apparatus comprises an extractor which extracts a focus signal from the image signal, and a controller which performs focus control based on the extracted focus signal. The number of the focus signals extracted by the extractor is changed depending on a resolution for recording the image signal.

According to yet another aspect, the present invention provides a method of adjusting focus with an optical apparatus which records a picked-up image signal. The method comprises a first step of extracting a focus signal from an image signal through each of a plurality of band-pass filters for different frequency bands, the focus signal representing the sharpness of an image, and a second step of performing focus control based on the extracted focus signal. In the second step, the band-pass filters are selectively used to extract the focus signal depending on a resolution for recording the image signal.

According to another aspect, the present invention provides a method of adjusting focus with an optical apparatus which records a picked-up image signal. The method comprises a first step of extracting a focus signal from an image signal, the focus signal representing the sharpness of an image, and a second step of performing focus control based on the extracted focus signal. In the second step, the number of the extracted focus signals is changed depending on a resolution for recording the image signal.

BRIEF DESCRIPTION OF THE DRAWINGS

Embodiment 1

In FIG. 1, in order from an object side, not shown, reference numeral 101 shows a first fixed lens unit, 102 a second lens unit which is movable in the direction of an optical axis to provide variable magnification, and 103 an aperture. Reference numeral 104 shows a third fixed lens unit, and 105 a focus compensator lens (hereinafter refeffed to as a focus lens) which is movable in the optical axis direction to compensate for the movement of a focal plane associated with varied magnification and to achieve focusing. These components constitute an image-pickup optical system.

DETAILED DESCRIPTION OF THE PREFERRED EMBODIMENTS

Preferred embodiments of the present invention will hereinafter be described with reference to the drawings.

Embodiment 1

Figure 1:
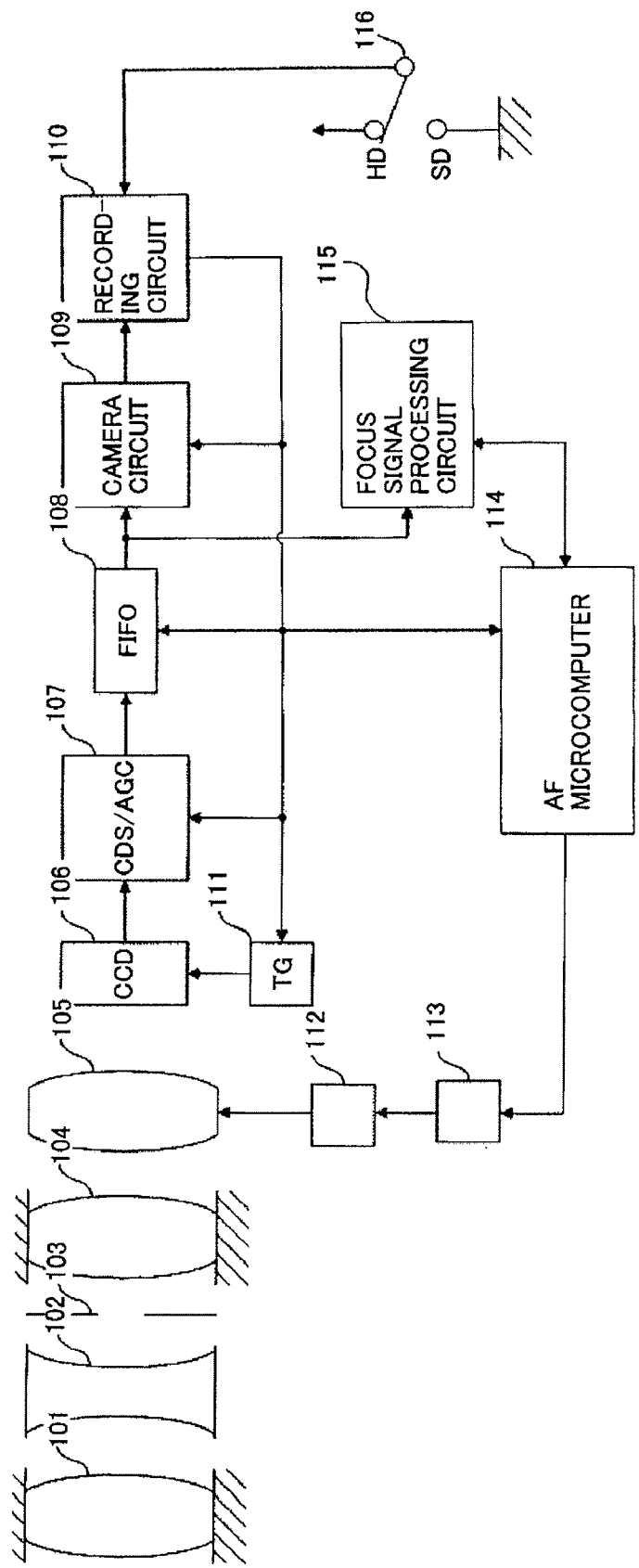
FIG. 1 shows the structure of a video camera (optical apparatus) which is Embodiment 1 of the present invention.
Figure 2:
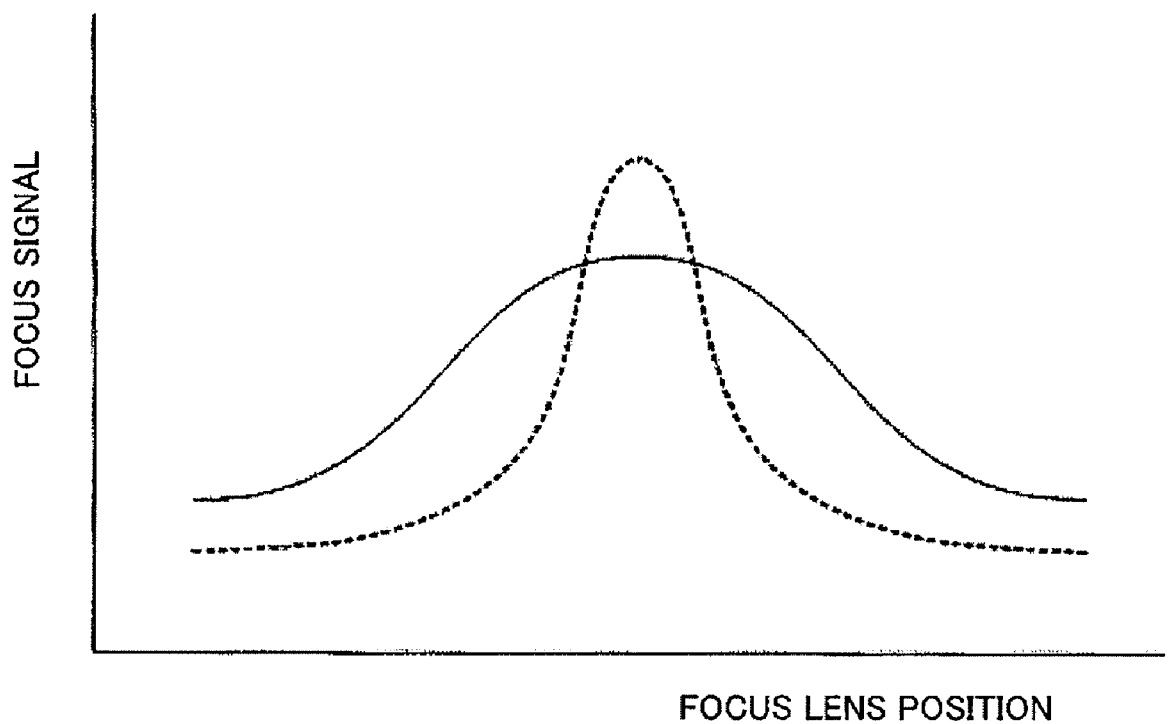
FIG. 2 is a graph showing characteristics of focus signals.

FIG. 1 shows the structure of a video camera (optical apparatus) which is Embodiment 1 of the present invention. In FIG. 1, in order from an object side, not shown, reference numeral 101 shows a first fixed lens unit, 102 a second lens unit which is movable in the direction of an optical axis to provide variable magnification, and 103 an aperture. Reference numeral 104 shows a third fixed lens unit, and 105 a focus compensator lens (hereinafter referred to as a focus lens) which is movable in the optical axis direction to compensate for the movement of a focal plane associated with varied magnification and to achieve focusing. These components constitute an image-pickup optical system.

Figure 3:
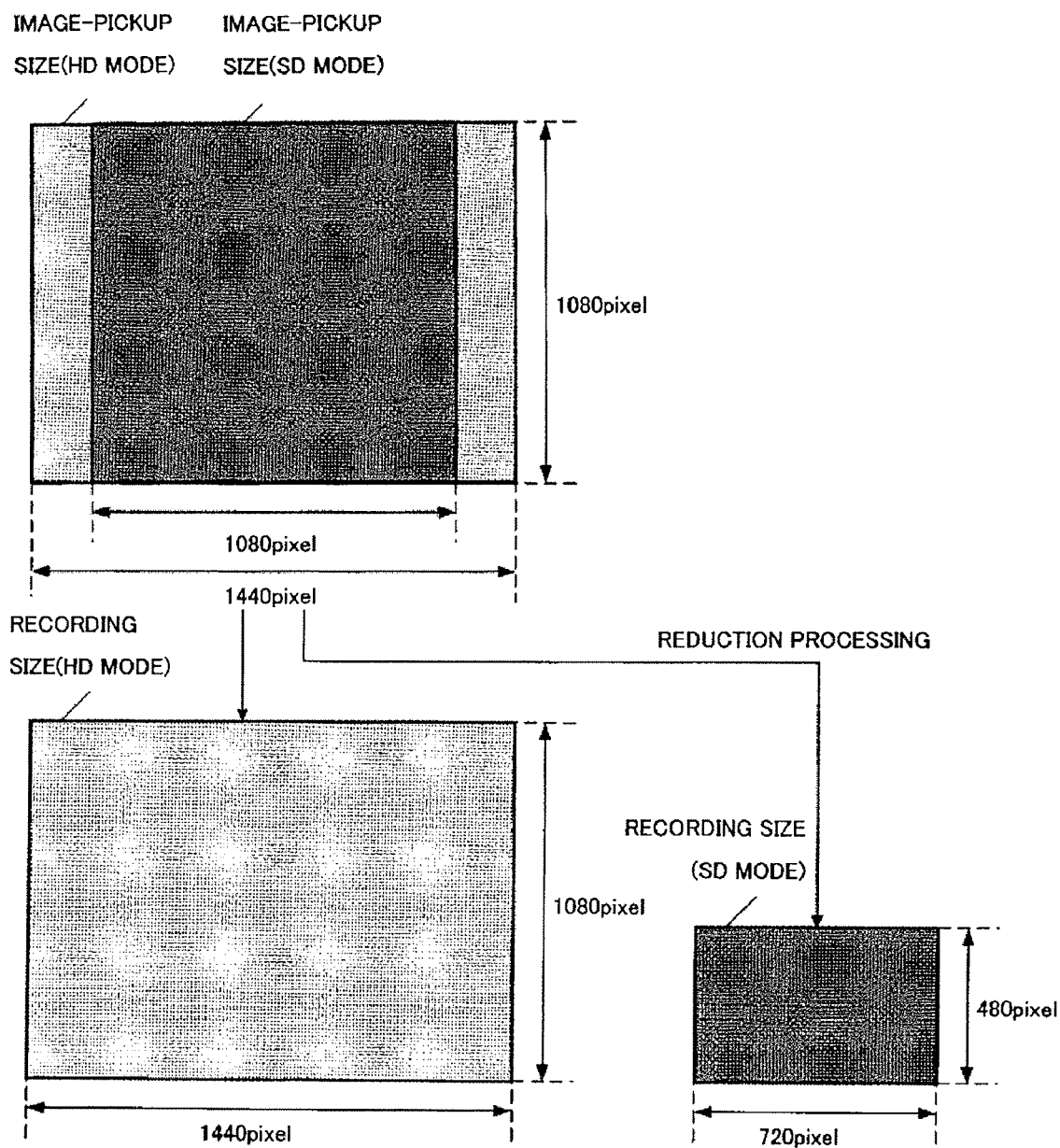
FIG. 3 shows sizes of images to be recorded.

Reference numeral 106 shows an image-pickup element serving as a photoelectrical conversion element formed of a CCD sensor or a CMOS sensor. As shown in FIG. 3, the image-pickup element 106 has a sufficient number of pixels for the HD image and has an aspect ratio of 16:9.

Reference numeral 107 shows a CDS/AGC/AD converter which performs sampling, gain control, and digital conversion on an image-pickup signal output from the image-pickup element 106 to produce an image signal.

Reference numeral 108 shows a FIFO memory which takes out only signal components of an area to be used by a camera signal processing circuit, later described, in a vertical direction from an output of the converter 107 and outputs in accordance with a clock signal.

Reference numeral 109 shows the camera signal processing circuit which processes an image signal output from the FIFO memory 108 to produce an image signal for an SD image (hereinafter referred to as an SD image signal) and an image signal for an HD image (hereinafter referred to as an HD image signal). Specifically, as shown in FIG. 3, the camera signal processing circuit 109 produces the HD image signal from an image signal input thereto via the FIFO memory 108 from a first image-pickup area (1440 H×1080 V) of the image-pickup element 106. The camera signal processing circuit 109 also produces the SD image signal by reducing an image signal from a second image-pickup area (1080 H×1080 V).

Reference numeral 110 shows a recording circuit which records the HD image signal and the SD image signal on a recording medium in the form of a recording image appropriate for the recording medium. A magnetic tape, an optical disk, a semiconductor memory or the like can be used as the recording medium.

Reference numeral 111 shows a driving-pulse generator (timing generator) for driving the image-pickup element 106.

Reference numeral 112 shows a focus actuator such as a stepping motor and a vibration-type motor which drives the focus lens 105 in the optical axis direction.

Reference numeral 113 shows a focus driver which drives the focus actuator 112 with a signal from an AF microcomputer 114, later described.

The AF microcomputer (controller) 114 controls the focus driver 113 based on an output signal from a focus signal processing circuit 115, later described, to drive the focus lens 105.

Reference numeral 115 shows the focus signal processing circuit serving as an extractor that extracts a focus signal, which is a high-frequency component used in focus detection, from an output signal (an image signal passed through the CDS/AGC/AD converter 107) of the FIFO memory 108. The focus signal is typically referred to as an AF evaluation value signal which represents the sharpness (contrast) of an image.

Reference numeral 116 shows a switch which is operated by a user to switch the image to be recorded between the HD and SD images. The resolutions(definitions) of the images to be recorded are associated with image-pickup modes. The image-pickup modes include an HD mode for recording the HD image and an SD mode for recording the SD image.

Next, description will be made of AF control performed by the AF microcomputer 114 with reference to a flow chart in FIG. 5. The control operation is performed in accordance with software (computer program) stored on the AF microcomputer 114.

Figure 5:
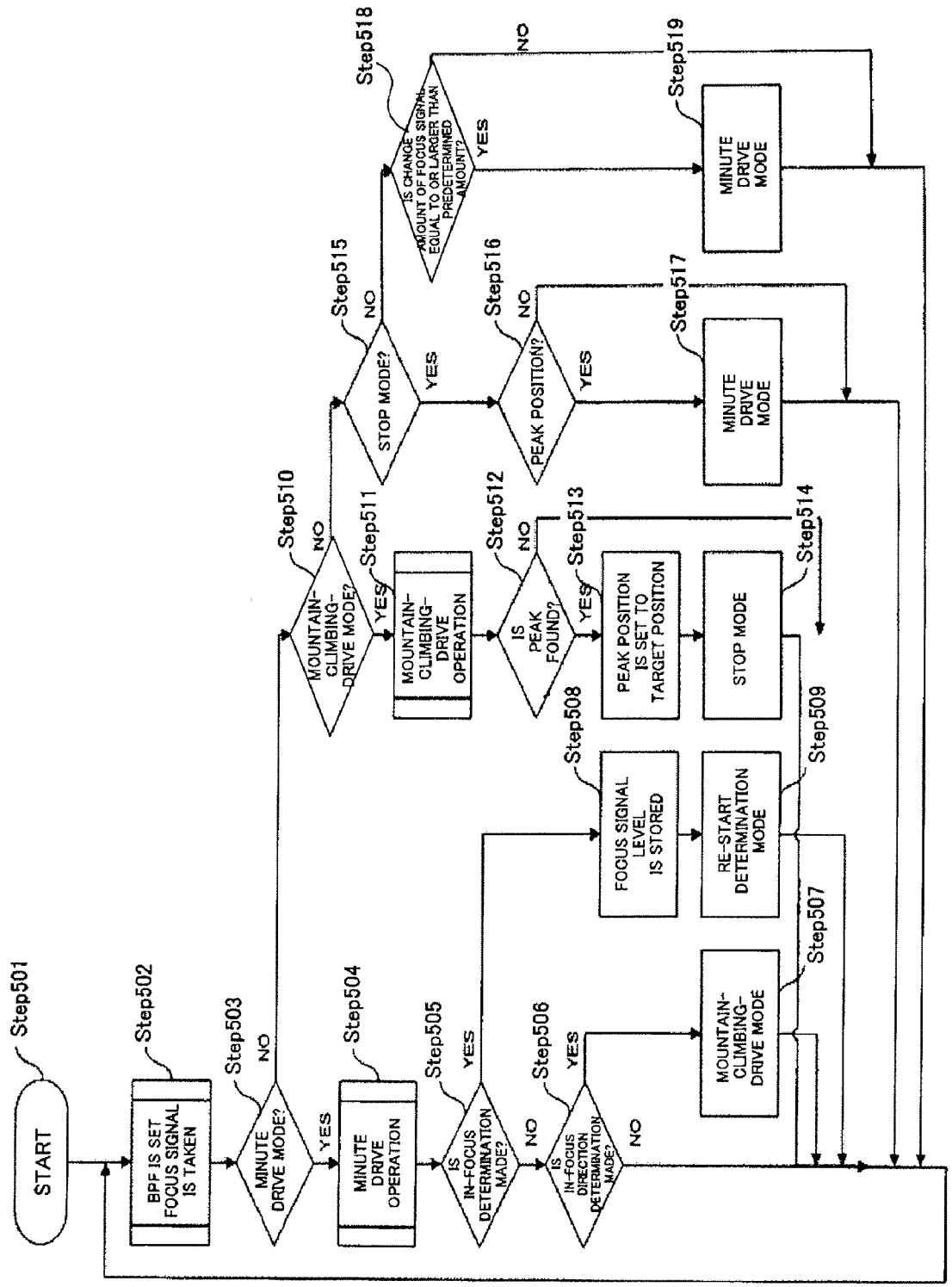
FIG. 5 is a flow chart showing the operation of AF control in Embodiment 1.

In FIG. 5, Step 501 shows the start of the processing.

At Step 502, filter coefficients are set in the focus signal processing circuit 115 to change the frequency characteristics of band-pass filters. A focus signal is taken from the focus signal processing circuit 115. The detailed operation at Step 502 will be described later.

At Step 503, it is determined whether or not the current AF mode is a minute-drive mode. If yes, the flow proceeds to minute-drive processing at Step 504 and afterward. If no, the flow proceeds to Step 510.

At Step 504, minute-drive operation is performed. The focus lens 105 is driven within the depth of focus, and then it is determined whether or not focus is achieved, or in which direction the in-focus point is present. The detailed operation at Step 504 will be described later.

At Step 505, it is determined whether or not an in-focus determination is made. If yes, the flow proceeds to Step 508, or to Step 506 if no.

At Step 506, it is determined whether or not an in-focus direction determination is made in the minute-drive operation at Step 504. If yes, the flow proceeds to step S507 to enter a mountain-climbing-drive mode. If no, the flow returns to Step 502 to continue the minute-drive mode.

At Step 508, the level of the focus signal when the in-focus state is obtained is stored in the memory and then the flow proceeds to Step 509 to enter a re-start determination mode.

At Step 510, it is determined whether or not the current AF mode is the mountain-climbing-drive mode. If yes, the flow proceeds to mountain-climbing-drive processing at Step 511 and afterward, or to Step 515 if no.

At Step 511, the focus lens 105 is driven at a predetermined speed in the direction in which the focus signal level is increased (mountain-climbing drive). The detailed operation at Step 511 will be described later.

At Step 512, it is determined whether or not the peak of the focus signal level is found in the mountain-climbing drive at Step 511. If the peak is found, the flow moves to Step 513, or if not, the flow returns to Step 502 to continue the mountain-climbing-drive mode.

At Step 513, the focus lens position where the focus signal is at the peak is set to the target position, and then the flow moves to Step 514 to enter a stop mode.

At Step 515, it is determined whether or not the current mode is the stop mode. If yes, the flow moves to stop processing at Step 516 and afterward, or to Step 518 if no.

At Step 516, it is determined whether or not the focus lens 105 has returned to the position (in-focus point) where the peak of the focus signal is obtained. If yes, the flow moves to Step 517 to enter the minute-drive mode. If no, the flow returns to Step 502 to continue the stop mode.

At Step 518, the focus signal stored at Step 508 is compared with the current focus signal, and it is determined whether or not the change between those levels is greater than a predetermined value. If the change in the focus signal level is larger than the predetermined value, the flow moves to Step 519 to enter the minute-drive mode, or stops and returns to Step 502.

Next, description will be made of the setting of the filter coefficient in the focus signal processing circuit 115 and the taking of the focus signal with reference to a flow chart in FIG. 6.

Figure 6:
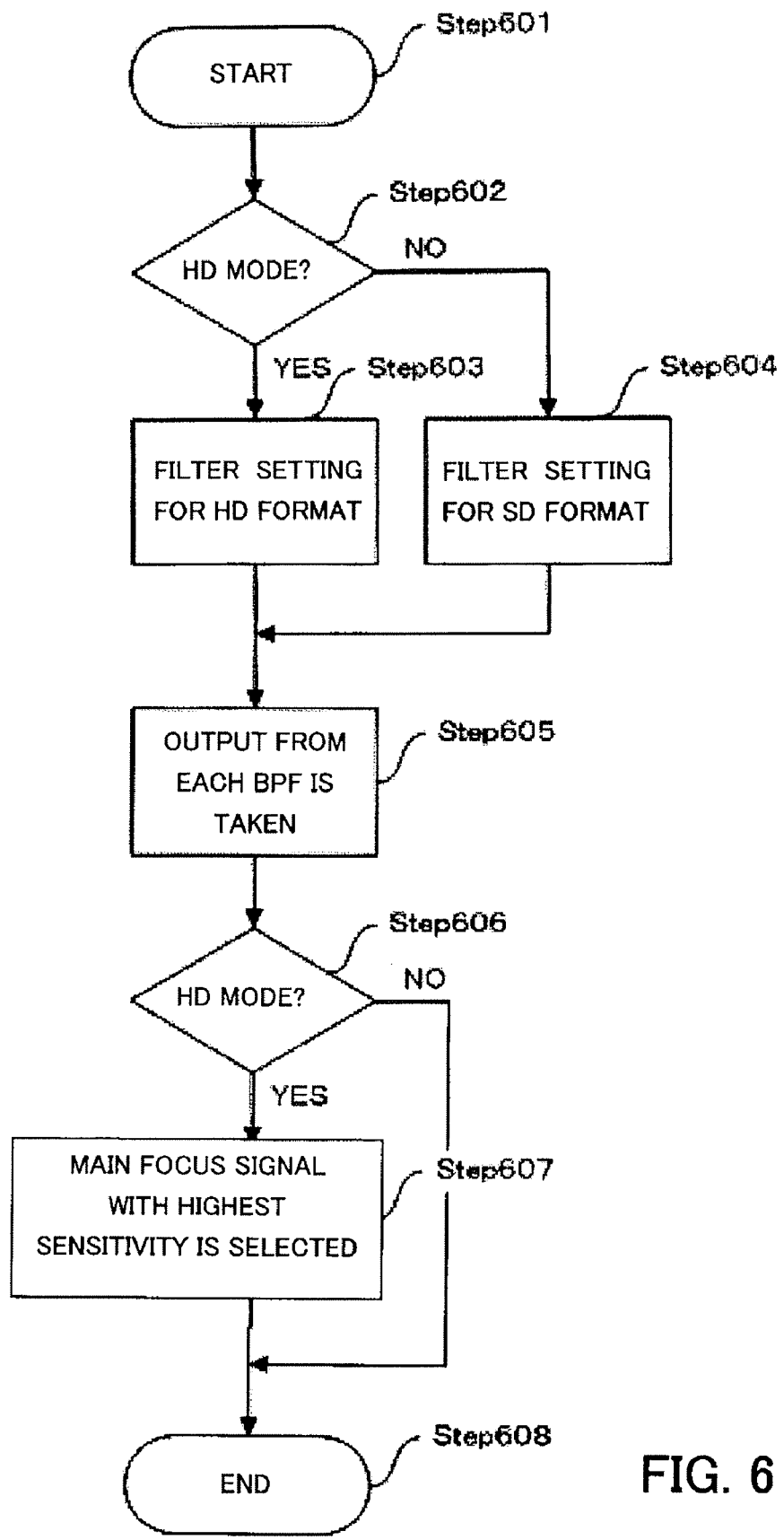
FIG. 6 is a flow chart showing the operation of setting of a band-pass filter and taking of a focus signal in Embodiment 1.

In FIG. 6, Step 601 shows the start of the processing.

At Step 602, the image-pickup mode is determined. In the HD mode, the flow moves to Step 603. In the SD mode, the flow moves to Step 604.

Figure 7:
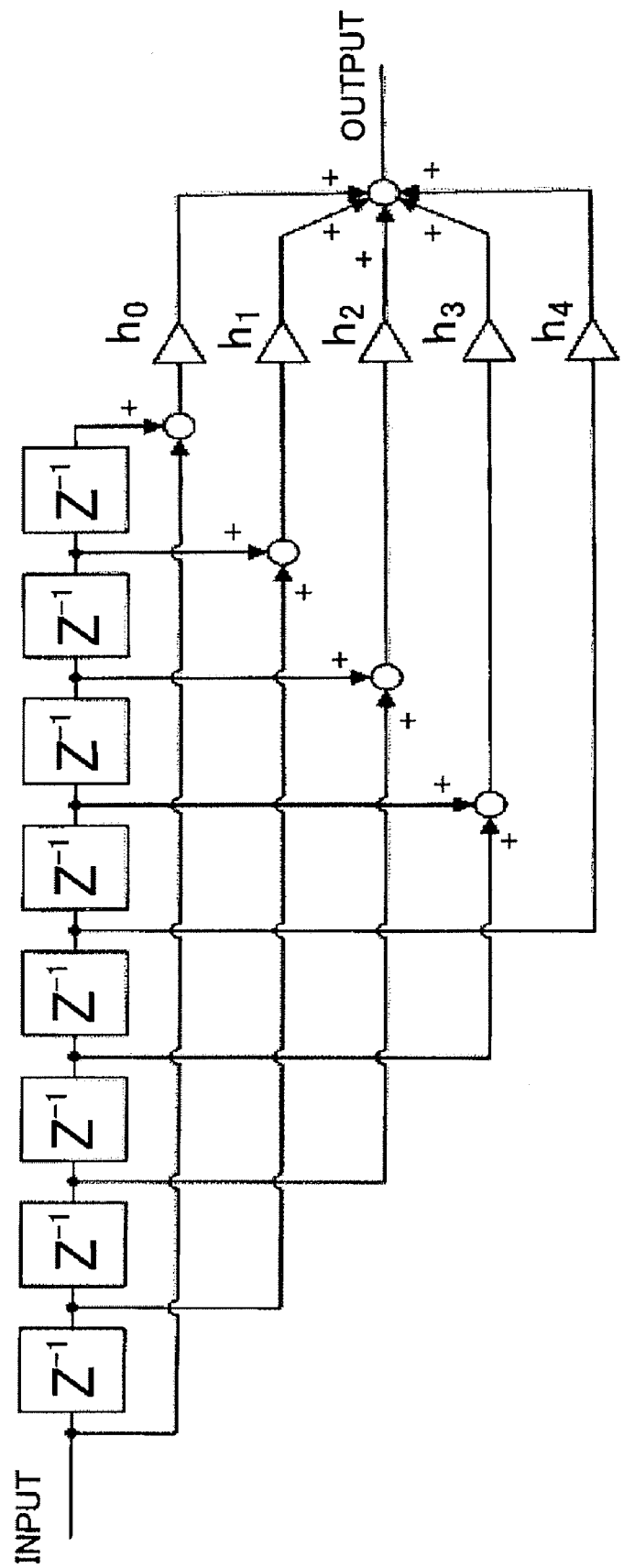
FIG. 7 shows the structure of an FIR-type digital filter in Embodiment 1.

At Step 603, filter setting is made for the HD image. In Embodiment 1, a plurality of high-frequency band-pass filters with different extraction characteristics are provided as the filter for the HD image. The extraction characteristic refers to the frequency characteristic of the band-pass filter. The setting in this case means changing the set values of the band-pass filters in the focus signal processing circuit 115. For example, in a digital filter of an FIR (Finite Impulse Response) type as shown in FIG. 7, the setting corresponds to changing coefficients $h_o$ to $h_4$. The band-pass filter in Embodiment 1 may be realized by a filter other than the FIR-type digital filter, and for example, a filter of an IIR (Infinite Impulse Response) type can be used.

At Step 604, filter setting is made for the SD image. The filter for the SD image is formed of a high-frequency band-pass filter for determining an in-focus point and a low-frequency band-pass filter for determining a direction when significant blurring exists, as conventional filters for the SD image.

At Step 605, the value of the focus signal, which is the output from each band-pass filter, is taken.

At Step 606, the image-pickup mode is again determined. In the HD mode, the flow moves to Step 607. In the SD mode, the flow moves to Step 608.

At Step 607, the output values from the respective band-pass filters taken at Step 605 are compared with each other. The focus signal with the largest output change relative to a certain moving amount of the focus lens 105, that is, having the highest sensitivity, is defined (selected) as the main focus signal for use in AF control (focus signal for AF).

At Step 608, the processing is ended.

In this manner, in Embodiment 1, the characteristics of the processing of producing the focus signal are changed depending on the image to be recorded (in other words, the HD or SD image). In addition, the band-pass filter to be used, that is, the focus signal for AF is dynamically selected on the basis of the states (sensitivity) of the focus signals. This allows AF control to be performed with the focus signal optimal for each image-pickup mode and appropriate for the object image.

Next, the minute-drive operation will be described with reference to a flow chart in FIGS. 8A and 8B.

Figure 8A:
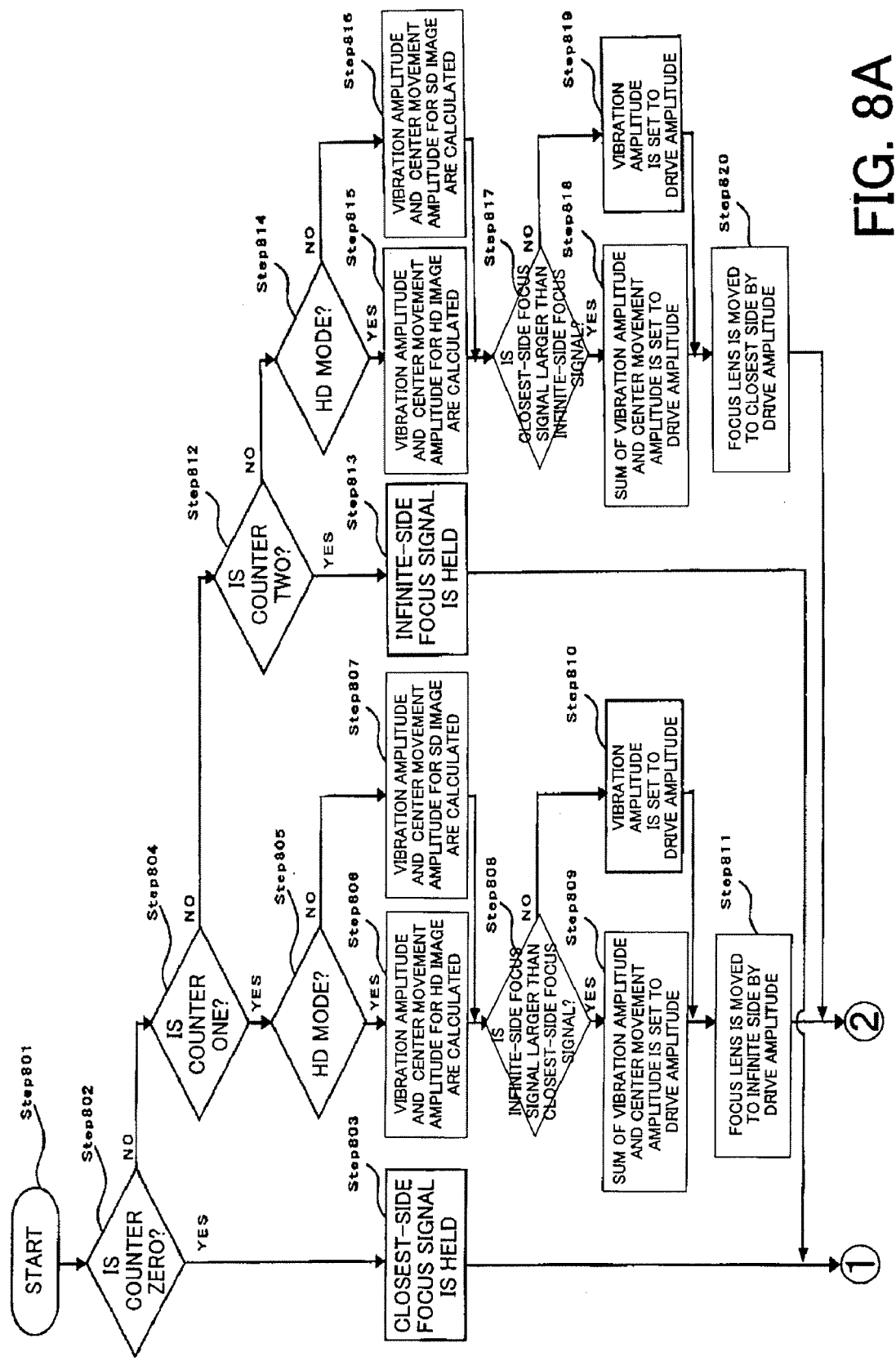
FIGS. 8A and 8B are flow charts showing the operation in a minute-drive mode in Embodiment 1.
Figure 8B:
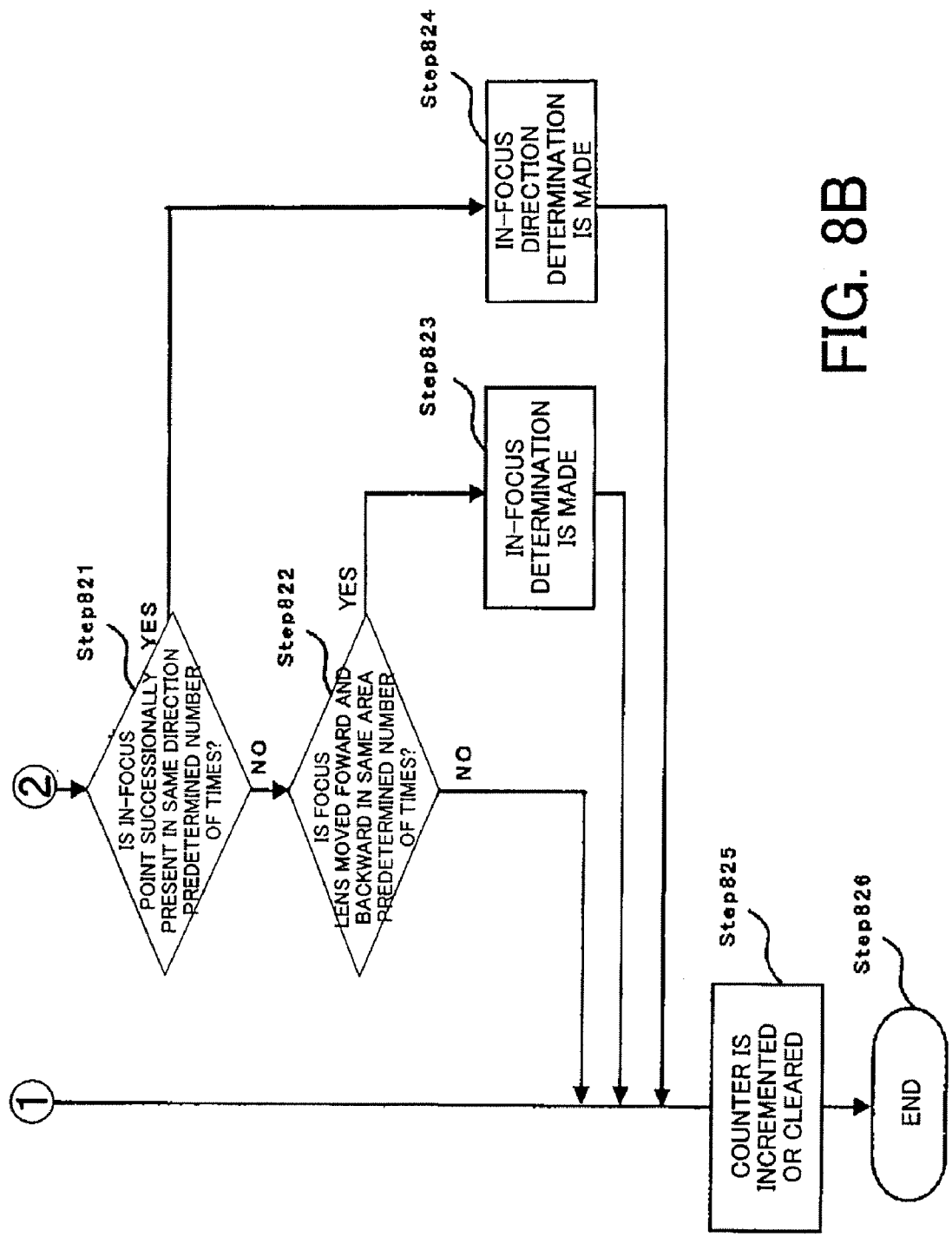

In FIG. 8A, Step 801 shows the start of the processing.

At Step 802, the current state of a counter is determined. If it shows zero, the flow moves to processing at Step 803 performed when the focus lens 105 is located on the closest side, or to Step 804 otherwise.

At Step 803, the focus signal is held as the processing performed when the focus lens is located on the closest side. The focus signal in this case is provided by the image signal produced from electric charge accumulated on the image-pickup element 106 when the focus lens is located on the infinite side at Step 813, later described.

At Step 804, the current state of the counter is determined. If it shows one, the flow moves to processing at Step 805 and afterward for driving the focus lens 105 toward the infinite side, or to Step 812 if otherwise.

At Step 805, it is determined whether or not the image signal is for an HD image. If yes, the flow moves to Step 806, or to Step 807 if it is for an SD image.

At Step 806, the vibration amplitude and the center movement amplitude are calculated for the HD image. These amplitudes are typically set within the depth of focus.

At Step 807, the vibration amplitude and the center movement amplitude are calculated for the SD image. These amplitudes are typically set within the depth of focus in view of reduction processing.

At Step 808, the focus signal level on the closest side held at Step 803 is compared with the focus signal level on the infinite side held at Step 813, later described. If the latter is larger, the flow moves to Step 809. If the former is larger, the flow moves to Step 810.

At Step 809, the vibration amplitude is added to the center movement amplitude to determine the drive amplitude.

At Step 810, the vibration amplitude is set to the drive amplitude.

At Step 811, the drive amplitude determined at Step 809 or Step 810 is used to drive the focus lens 105 in the infinite direction.

At Step 812, the current state of the counter is determined. If it shows two, the flow moves to processing at Step 813 and afterward performed when the focus lens 105 is located on the infinite side, or to Step 814 otherwise.

At Step 813, the focus signal is held as the processing performed when the focus lens is located on the infinite side. The focus signal in this case is provided by the image signal produced from electric charge accumulated on the image-pickup element 106 when the focus lens is located on the closest side at Step 803.

At Step 814, it is determined whether or not the image signal is for an HD image. If yes, the flow moves to Step 815, or to Step 816 if it is for an SD image.

At Step 815, the vibration amplitude and the center movement amplitude are calculated for the HD image. These amplitudes are typically set within the depth of focus as described above.

At Step 816, the vibration amplitude and the center movement amplitude are calculated for the SD image. These amplitudes are typically set within the depth of focus in view of reduction processing as described above.

At Step 817, the focus signal level on the infinite side held at Step 813 is compared with the focus signal level on the closest side held at Step 803. If the latter is larger, the flow moves to Step 818. If the former is larger, the flow moves to Step 819.

At Step 818, the vibration amplitude is added to the center movement amplitude to determine the drive amplitude.

At Step 819, the vibration amplitude is set to the drive amplitude.

At Step 820, the drive amplitude determined at Step 818 or Step 819 is used to drive the focus lens 105 in the closest direction.

At Step 821, it is determined whether or not the in-focus point is successionally present in the same direction a predetermined number of times. If yes, the flow moves to Step 824, or to Step 822 if no.

At Step 822, it is determined whether or not the focus lens 105 is moved forward and backward in the same area a predetermined number of times. If yes, the control moves to Step 823, or to Step 825 if no.

At Step 823, it is determined that the in-focus determination is made.

At Step 824, it is determined that the in-focus direction determination is made.

At Step 825, the counter is returned to zero if it shows three. If it shows another value, the counter is incremented and the flow moves to Step 826.

At Step 826, the processing is ended.

Figure 9:
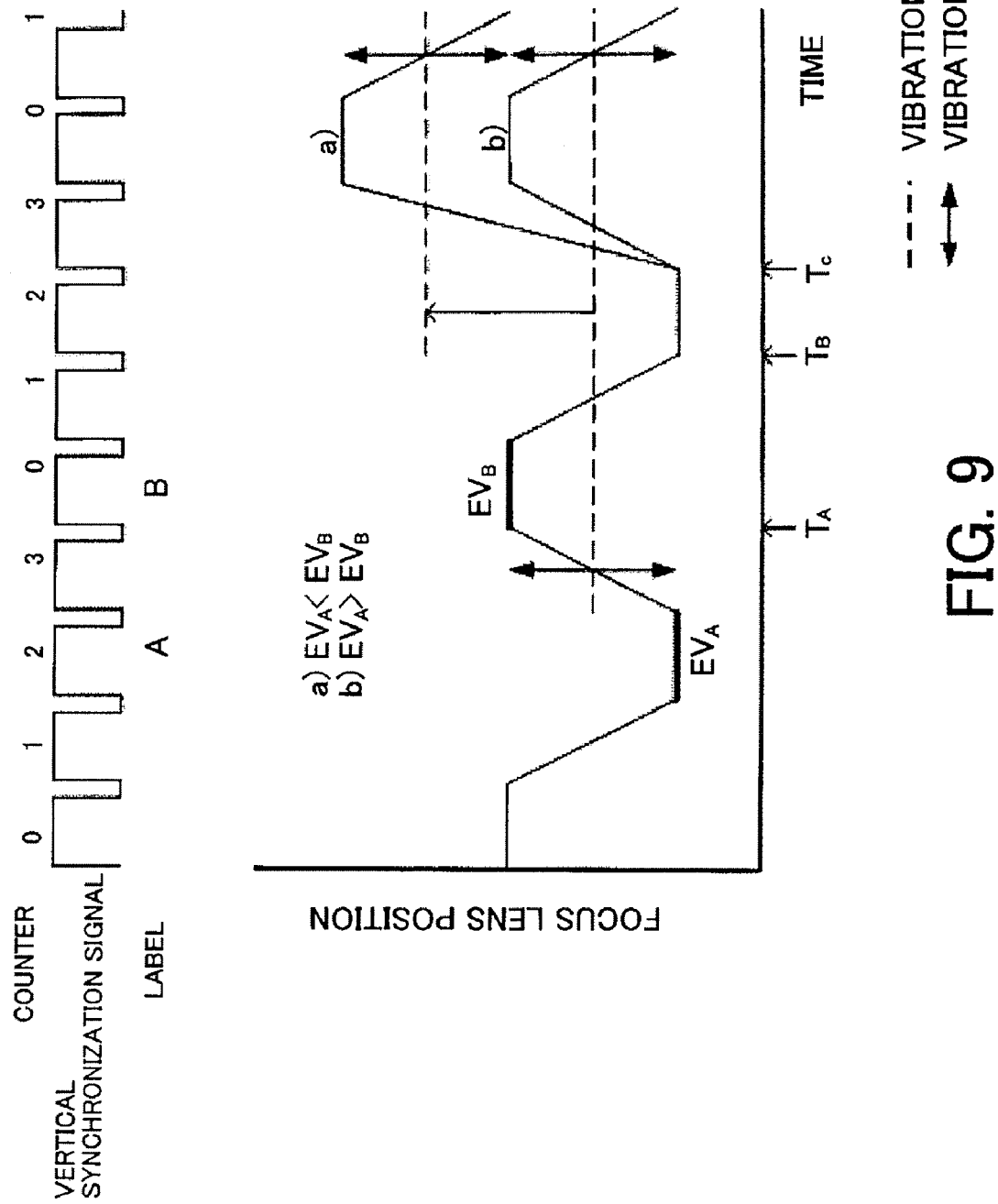
FIG. 9 shows the driving of a focus lens and the change of a focus signal in the minute-drive mode in Embodiment 1.

FIG. 9 shows the drive of the focus lens 105 in the minute-drive operation with the lapse of time. A vertical synchronization signal of the image signal is shown in an upper section of FIG. 9. In a lower section of FIG. 9, the horizontal axis represents the time and the vertical axis represents the position of the focus lens 105. A focus signal $EV_A$ for the electric charge accumulated on the image-pickup element 106 for a time labeled A is taken by the AF microcomputer 114 at a time $T_A$. A focus signal $EV_B$ for the electric charge accumulated on the image-pickup element 106 for a time labeled B is taken by the AF microcomputer 114 at a time $T_B$.

At a time $T_C$, the focus signals $EV_A$ and $EV_B$ are compared. Only when the $EV_B$ is larger, the vibration center is moved. The movement of the focus lens 105 is based on the depth of focus and is set to the amount which is not recognizable on the image.

Figure 10:
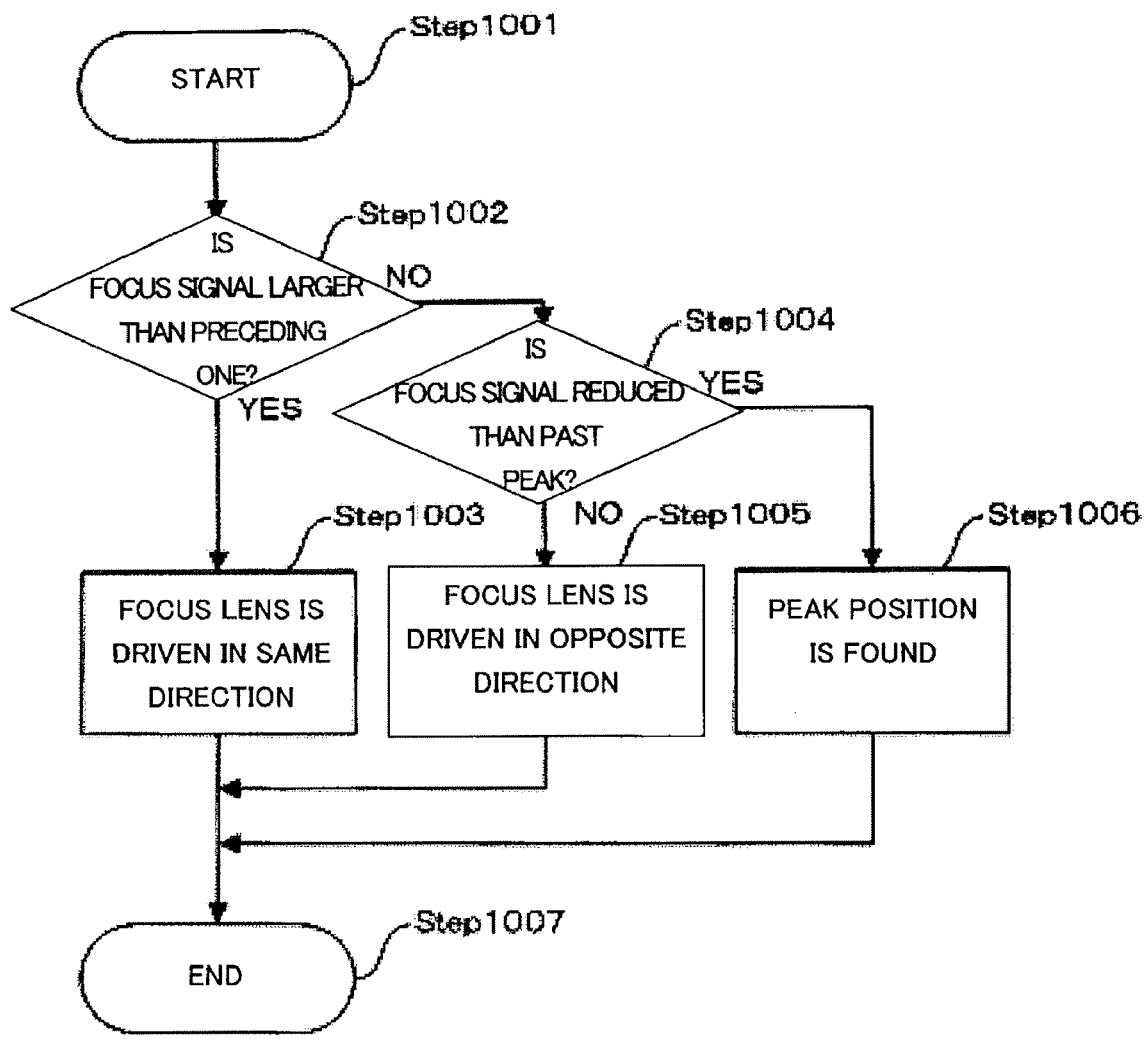
FIG. 10 is a flow chart showing the operation in a mountain-climbing-drive mode in Embodiment 1.

Next, the mountain-climbing-drive operation will be described with a flow chart in FIG. 10.

Step 1001 shows the start of the processing.

At Step 1002, it is determined whether or not the level of the focus signal is increased as compared with the preceding level. If yes, the flow moves to Step 1003, or to Step 1004 if no.

At Step 1003, the focus lens 105 is driven in the same direction as in the preceding drive at a predetermined speed, and then the flow moves to Step 1007.

At Step 1004, it is determined whether or not the focus signal is reduced past the peak. If yes, the flow moves to Step 1006. When it is reduced due to another factor, the flow moves to Step 1005.

At Step 1005, the focus lens 105 is driven in the opposite direction to that in the preceding drive at a predetermined speed, and then the flow moves to Step 1007.

At Step 1006, it is determined that the peak position of the focus signal is found.

At Step 1007, the processing is ended.

Figure 11:
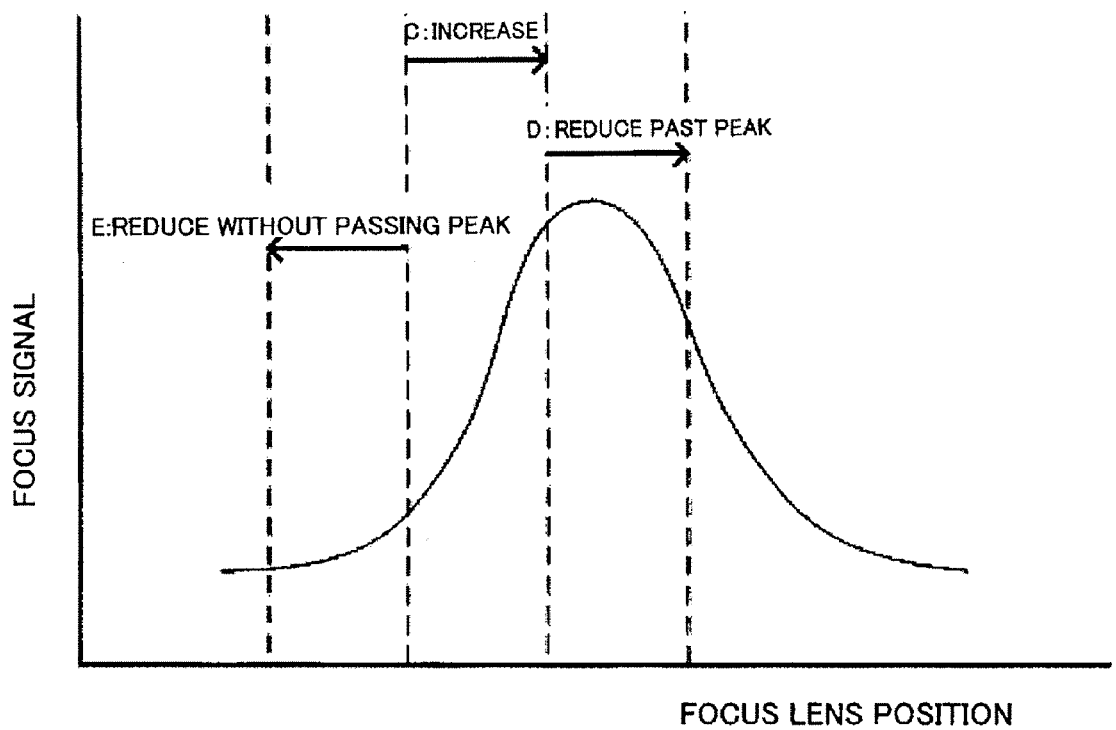
FIG. 11 is a graph showing the movement of the focus lens and the change of the focus state in the mountain-climbing drive in Embodiment 1.

FIG. 11 shows the movement of the focus lens 105 in the above mentioned mountain-climbing-drive operation. In FIG. 11, when the focus lens 105 is moved as indicated by an arrow C, the level of the focus signal is increased and thus the mountain-climbing drive is continued in the same direction. When the focus lens 105 is driven as indicated by an arrow D, the focus signal level once reaches the peak and then is reduced past the peak. In this case, it is determined the in-focus point is present and the mountain-climbing-drive operation is ended. After the focus lens 105 is returned to the peak position, the minute-drive operation is started. On the other hand, when the focus signal level is reduced without passing the peak position as indicated by an arrow E, it is determined that the drive direction is incorrect and the drive direction is reversed, and the mountain-climbing-drive operation is continued.

In this manner, the AF microcomputer 114 moves the focus lens 105 while repeating the re-start determination, minute-drive, mountain-climbing-drive, stop, minute-drive, and re-start determination in order. Thereby, the focus control is performed such that the maximum focus signal level is held to maintain the in-focus state.

As described above, according to Embodiment 1, the frequency characteristic of the band-pass filter is set in the SD mode to provide the extraction characteristic of the focus signal equal to that of the conventional SD image. This can realize the same level of performance as that of an apparatus dedicated to the SD image. On the other hand, in the HD mode, the band-pass filter with a higher central frequency can be used as compared with that in the SD mode to produce the focus signal having an abruptly changing characteristic, thereby performing sensitive in-focus determination appropriate for the HD image.

Figure 4:
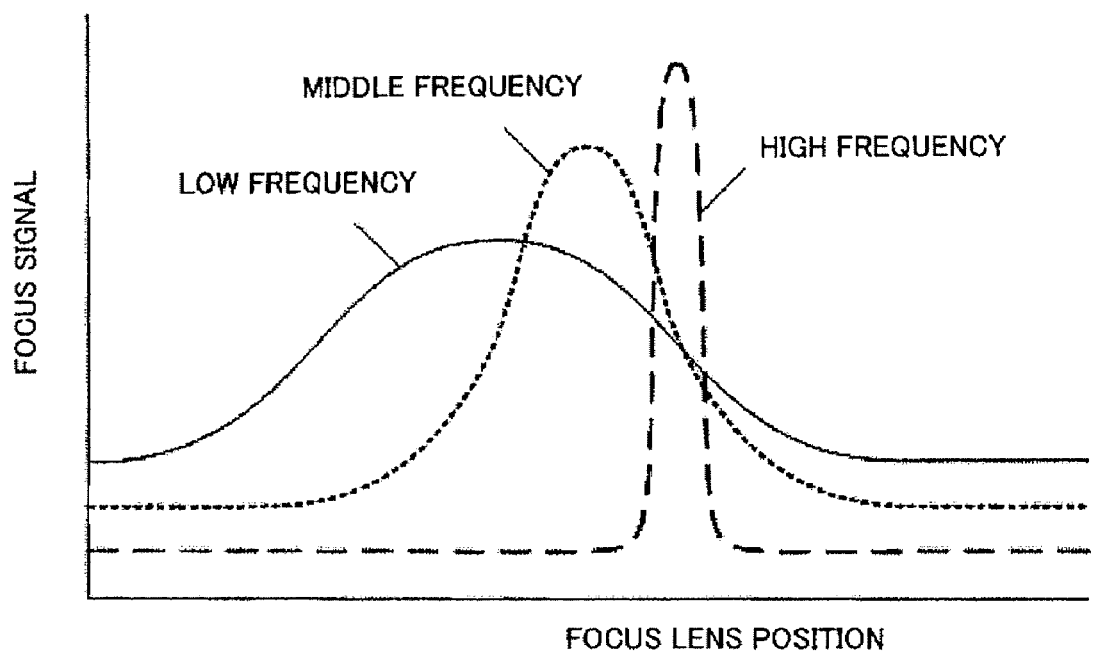
FIG. 4 is a graph showing characteristics of focus signals in an HD mode.

Specifically, when three band-pass filters have different frequency characteristics with the central frequencies of 300 kHz (low frequency), 1.5 MHz (middle frequency), and 6 MHz (high frequency) as shown in FIG. 4, the filter with the central frequency of 300 kHz is used in the SD mode. On the other hand, in the HD mode, the filter with the central frequency of 1.5 MHz or 6 MHz is used. In this manner, the band-pass filters are selectively used to take the focus signal for AF.

For the HD mode, more band-pass filters (with different frequency characteristics) are provided than those in the SD mode by at least one, and one of the band-pass filters for use is dynamically selected depending on the output state (sensitivity) of the taken focus signal. For example, one of two focus signals from the band-pass filters with the central frequencies of 1.5 MHz and 6 MHz that is the most sensitive to the movement of the focus lens is selected.

Thus, the in-focus point can be accurately determined even for an object at low contrast. As a result, in a video camera which can support a plurality of images to be recorded (HD/SD), AF control can be performed optimally for each of the images to be recorded and appropriately for each object image.

Embodiment 2

Figure 12:
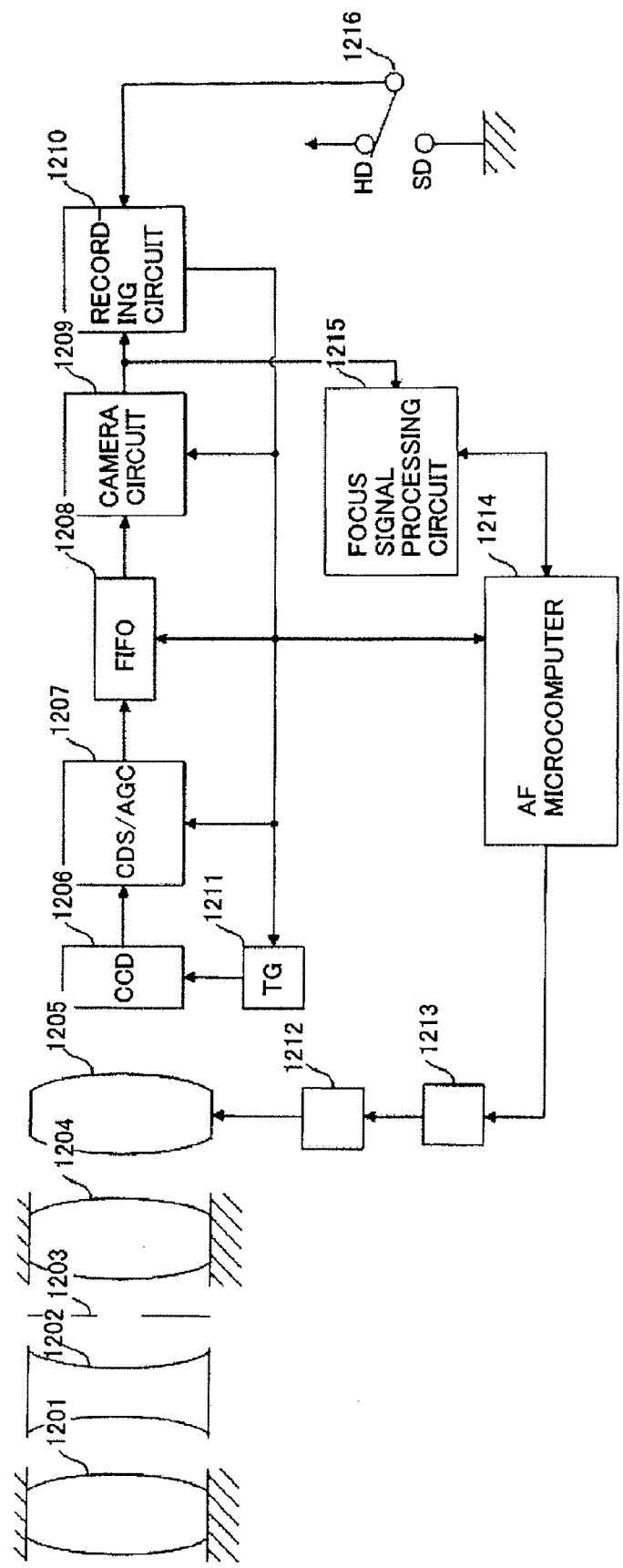
FIG. 12 shows the structure of a video camera which is Embodiment 2 of the present invention.

FIG. 12 shows the structure of a video camera which is Embodiment 2 of the present invention. In FIG. 12, in order from an object side, reference numeral 1201 shows a first fixed lens unit, 1202 a second lens unit which is movable in the direction of an optical axis to provide variable magnification, and 1203 an aperture. Reference numeral 1204 shows a third fixed lens unit, and 1205 a focus compensator lens (hereinafter referred to as a focus lens) which is movable in the optical axis direction to compensate for the movement of a focal plane associated with varied magnification and achieve focusing. These components constitute an image-pickup optical system.

Reference numeral 1206 shows an image-pickup element serving as a photoelectric conversion element formed of a CCD sensor or a CMOS sensor. As shown in FIG. 3, the image-pickup element 1206 has a sufficient number of pixels for the HD image and has an aspect ratio of 16:9.

Reference numeral 1207 shows a CDS/AGC/AD converter which performs sampling, gain adjustment, and digital conversion on an image-pickup signal output from the image-pickup element 1206 to produce an image signal.

Reference numeral 1208 shows a FIFO memory which takes out only signal components of an area to be used by a camera signal processing circuit, later described, in a vertical direction from an output of the converter 1207 and outputs in accordance with a clock signal.

Reference numeral 1209 shows the camera signal processing circuit which processes an image signal output from the FIFO memory 1208 to produce an SD image signal and an HD image signal. Specifically, as shown in FIG. 3, the camera signal processing circuit 1209 produces the HD image signal from an image signal input thereto via the FIFO memory 1208 from a first image-pickup area (1440 H×1080 V) of the image-pickup element 1206. The camera signal processing circuit 1209 also produces the SD image signal by reducing an image signal from a second image-pickup area (1080 H×1080 V).

Reference numeral 1210 shows a recording circuit which records the HD image signal and the SD image signal on a recording medium in the form of a recording image appropriate for the recording medium. A magnetic tape, an optical disk, a semiconductor memory or the like can be used as the recording medium.

Reference numeral 1211 shows a driving-pulse generator (timing generator) for driving the image-pickup element 1206.

Reference numeral 1212 shows a focus actuator such as a stepping motor and a vibration-type motor which drives the focus lens 1205 in the optical axis direction.

Reference numeral 1213 shows a focus driver which drives the focus actuator 1212 with a signal from an AF microcomputer 1214, later described.

The AF microcomputer 1214 controls the focus driver 1213 based on an output signal from a focus signal processing circuit 1215, later described, to drive the focus lens 1205.

Reference numeral 1215 shows the focus signal processing circuit serving as an extractor that extracts a focus signal, which is a high-frequency component used in focus detection, from the SD and HD image signals output from the camera signal processing circuit 1209.

Reference numeral 1216 shows a switch which is operated by a user to switch between images to be recorded. The images to be recorded are associated with image-pickup modes. The image-pickup modes include an HD mode for recording the HD image and an SD mode for recording the SD image.

In Embodiment 2, for the SD image, a signal is input to the focus signal processing circuit 1215 after the reduction processing. Thus, Embodiment 2 uses a sampling frequency different from that in Embodiment 1, and it is necessary to consider that in setting filter coefficients (for example, $h_o$ to $h_4$ in FIG. 7) of band-pass filters in the focus signal processing circuit 1215. The sampling frequency corresponds to a number of horizontal pixels of an image signal input to the focus signal processing circuit 1215.

In Embodiment 2, the AF microcomputer 114 operates as the same manner as in Embodiment 1 except for the input processing of the SD and HD image signals. For this reason, the control shown in FIG. 5 to FIG. 11 described in Embodiment 1 is also performed in Embodiment 2.

Embodiment 2 can provide the effects similar to those in Embodiment 1.

Embodiment 3

Figure 13:
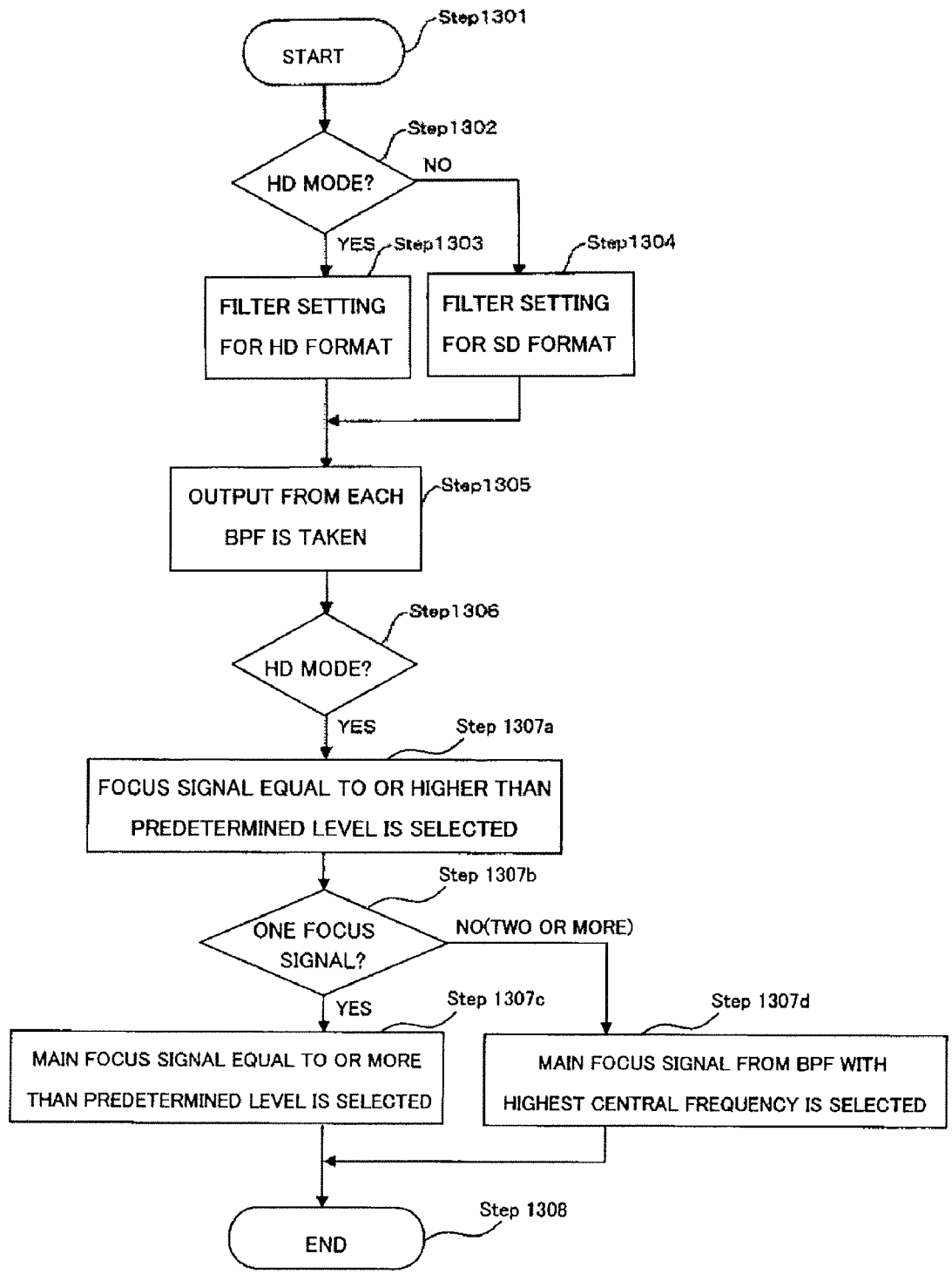
FIG. 13 is a flow chart showing the operation of setting of a filter and taking of a focus signal in a video camera which is Embodiment 3 of the present invention.

FIG. 13 is a flow chart showing setting of a filter coefficient in a focus signal processing circuit 115 and taking operation of a focus signal in a video camera which is Embodiment 3 of the present invention. The video camera in Embodiment 3 has the same structure as that in Embodiment 1 or Embodiment 2.

In FIG. 13, Steps 1301 to 1306 and Step 1308 except for Step 1307 (1307a to 1307d) corresponding to Step 607 in FIG. 6 are identical to Step 601 to 606 and Step 608 in FIG. 6. Thus, only Step 1307 will be described.

When the current image-pickup mode is the HD mode in Step 1306, an output value (focus signal) of each band-pass filter provided at Step 1305 is taken at Step 1307a. A focus signal (band-pass filter) having an output value equal to or higher than a predetermined level (predetermined state) is selected.

When only one focus signal is at a value equal to or higher than the predetermined level (Step 1307b), the focus signal is defined (selected) as a main AF focus signal for use in AF control (Step 1307c). If two or more focus signals are at values equal to or higher than the predetermined level, one of the focus signals that comes from the band-pass filter with the highest central frequency is defined as a main AF focus signal (Step 1307d).

In Embodiment 3, the frequency characteristic of the band-pass filter is set in the SD mode to provide the extraction characteristic of the focus signal equal to that of the conventional SD image. This can realize the same level of performance as that of an apparatus dedicated to the SD image. On the other hand, in the HD mode, the band-pass filter with a higher central frequency can be used as compared with that in the SD mode to produce the focus signal having an abruptly changing characteristic, thereby performing sensitive focus determination appropriate for the HD image.

For the HD mode, more band-pass filters (with different frequency characteristics) are provided than those in the SD mode by at least one, and one of the band-pass filters for use is dynamically selected depending on the output state (level) of the taken focus signal.

Thus, the in-focus point can be accurately determined even for an object at low contrast. As a result, in a video camera which can support a plurality of images to be recorded (HD/SD), AF control can be performed optimally for each of the images to be recorded and appropriately for each object image.

Thus, according to Embodiments 1 to 3, the optimal one of the focus signals extracted from the image signal can be selected for use in AF control. For example, when an image of an object at low contrast is taken in high resolution, a sufficiently accurate in-focus state can be achieved.

While Embodiments 1 to 3 have been described in conjunction with the video camera, the present invention is applicable to other optical apparatuses which perform AF control using a focus signal such as a digital still camera. The present invention is applicable to the case where an image-pickup optical system is provided integrally with a camera, the case where an interchangeable lens is removably mounted on a camera body, and a lens apparatus (optical apparatus) which receives an image signal from a camera body, produces a focus signal, and performs AF control.

Furthermore, the present invention is not limited to these preferred embodiments and various variations and modifications may be made without departing from the scope of the present invention.

This application claims foreign priority benefits based on Japanese Patent Application No. 2005-311442, filed on Oct. 26, 2005, which is hereby incorporated by reference herein in its entirety as if fully set forth herein.

What is claimed is:

1. An optical apparatus which records a picked-up image signal, the optical apparatus comprising:
   an extractor which includes a plurality of band-pass filters for different frequency bands and which extracts a focus signal from the image signal through each of the band-pass filters, the focus signal representing the sharpness of an image; and
   a controller which performs focus control based on the extracted focus signal,
   wherein the band-pass filters are selectively used to extract the focus signal depending on a resolution for recording the image signal, and
   wherein the number of the band-pass filters used in extracting the focus signal from the image signal is changed depending on the resolution for recording.

2. The optical apparatus according to claim 1, wherein the controller performs focus control based on the focus signal from the band-pass filter with the highest central frequency when a plurality of the focus signals are at values equal to or higher than a predetermined level.

3. An optical apparatus which records a picked-up image signal, the optical apparatus comprising:
   an extractor which includes a plurality of band-pass filters for different frequency bands and which extracts a focus signal from the image signal through each of the band-pass filters, the focus signal representing the sharpness of an image; and
   a controller which performs focus control based on the extracted focus signal,
   wherein the band-pass filters are selectively used to extract the focus signal depending on a resolution for recording the image signal, and
   wherein the controller performs focus control based on the focus signal which changes most relative to a certain moving amount of a focus lens.

4. An optical apparatus which records a picked-up image signal, comprising:
   an extractor which extracts a focus signal from the image signal, the focus signal representing the sharpness of an image; and
   a controller which performs focus control based on the extracted focus signal,
   wherein the number of the focus signals extracted by the extractor is changed depending on a resolution for recording the image signal.

5. The optical apparatus according to claim 4, wherein the extractor extracts a plurality of the focus signals from the image signal with a specific resolution.

6. The optical apparatus according to claim 4, wherein the number of the focus signals extracted by the extractor is increased as the resolution for recording is higher.

7. The optical apparatus according to claim 4, wherein the extractor includes a plurality of band-pass filters for different frequency bands, and the number of the band-pass filters used in extracting the focus signal from the image signal is changed depending on the resolution for recording.

8. The optical apparatus according to claim 4, wherein the controller performs focus control based on the focus signal which changes most relative to a certain moving amount of a focus lens.

9. The optical apparatus according to claim 4, wherein the controller performs focus control based on the focus signal with a value equal to or higher than a predetermined level.

10. The optical apparatus according to claim 4, wherein the extractor includes a plurality of band-pass filters for different frequency bands, and when a plurality of the focus signals are at values equal to or higher than the predetermined level, the controller performs focus control based on the focus signal from the band-pass filter with the highest central frequency.

11. A method of adjusting focus with an optical apparatus which records a picked-up image signal, comprising:
    a first step of extracting a focus signal from an image signal, the focus signal representing the sharpness of an image; and
    a second step of performing focus control based on the extracted focus signal,
    wherein the number of the extracted focus signals is changed depending on a resolution for recording the image signal.

12. A method of adjusting focus with an optical apparatus which records a picked-up image signal, the method comprising:
    a first step of extracting a focus signal from an image signal through each of a plurality of band-pass filters for different frequency bands, the focus signal representing the sharpness of an image; and
    a second step of performing focus control based on the extracted focus signal,
    wherein the band-pass filters are selectively used to extract the focus signal depending on a resolution for recording the image signal, and
    wherein the number of the band-pass filters used in extracting the focus signal from the image signal is changed depending on the resolution for recording.

13. A method of adjusting focus with an optical apparatus which records a picked-up image signal, the method comprising:
    a first step of extracting a focus signal from an image signal through each of a plurality of band-pass filters for different frequency bands, the focus signal representing the sharpness of an image; and
    a second step of performing focus control based on the extracted focus signal,
    wherein the band-pass filters are selectively used to extract the focus signal depending on a resolution for recording the image signal, and
    wherein the second step performs focus control based on the focus signal which changes most relative to a certain moving amount of a focus lens.

* * * * *